UNITED STATES PATENT OFFICE.

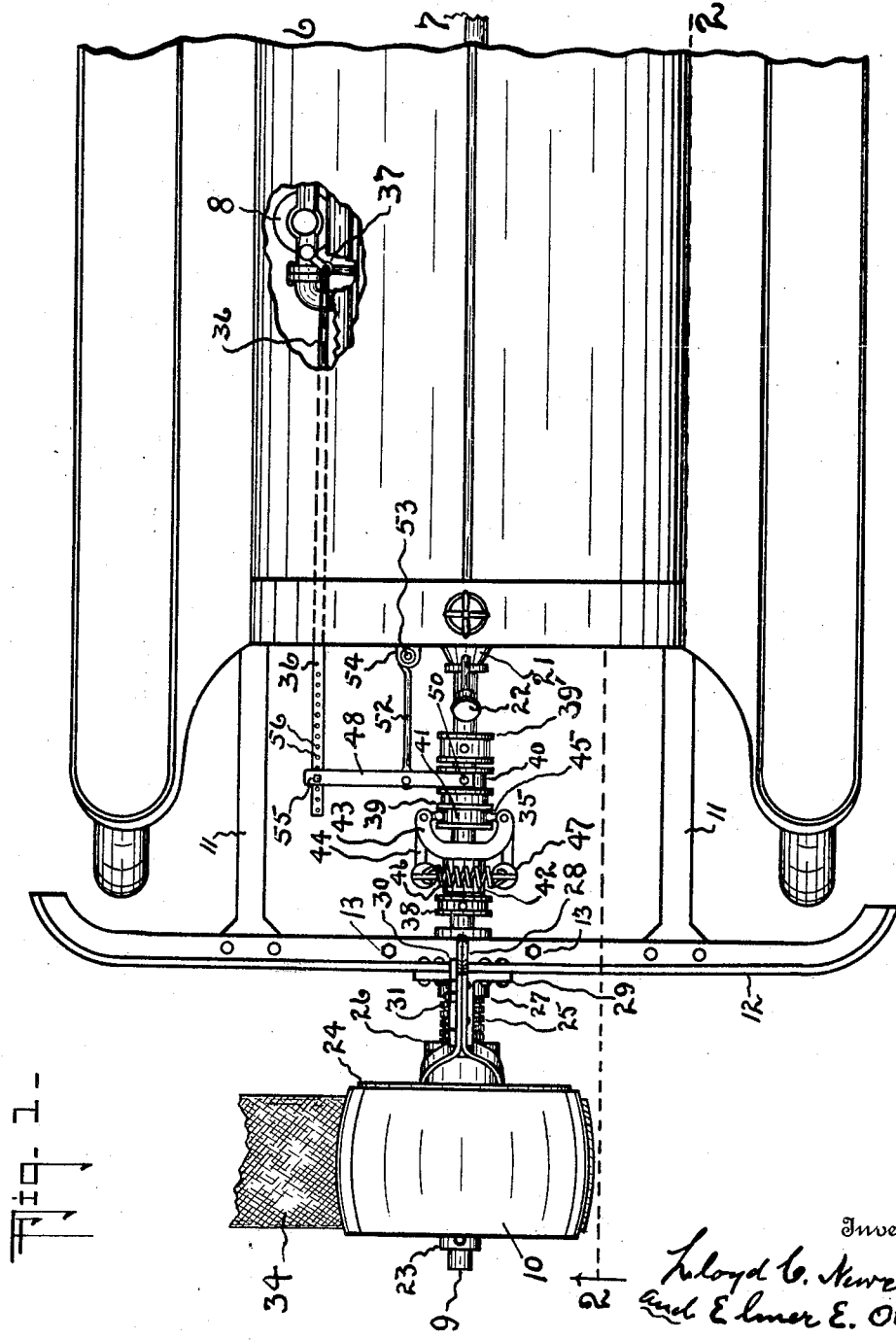

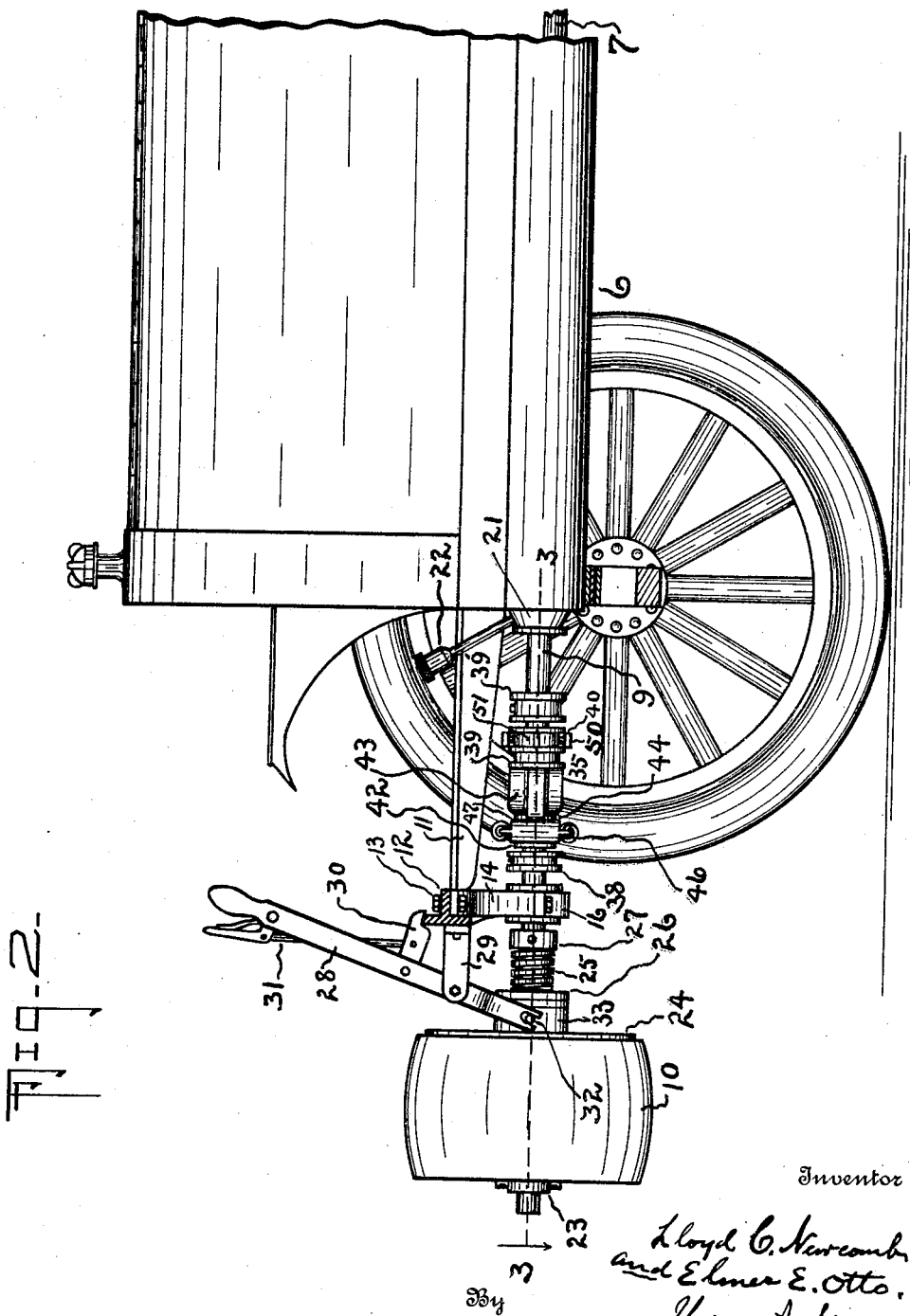

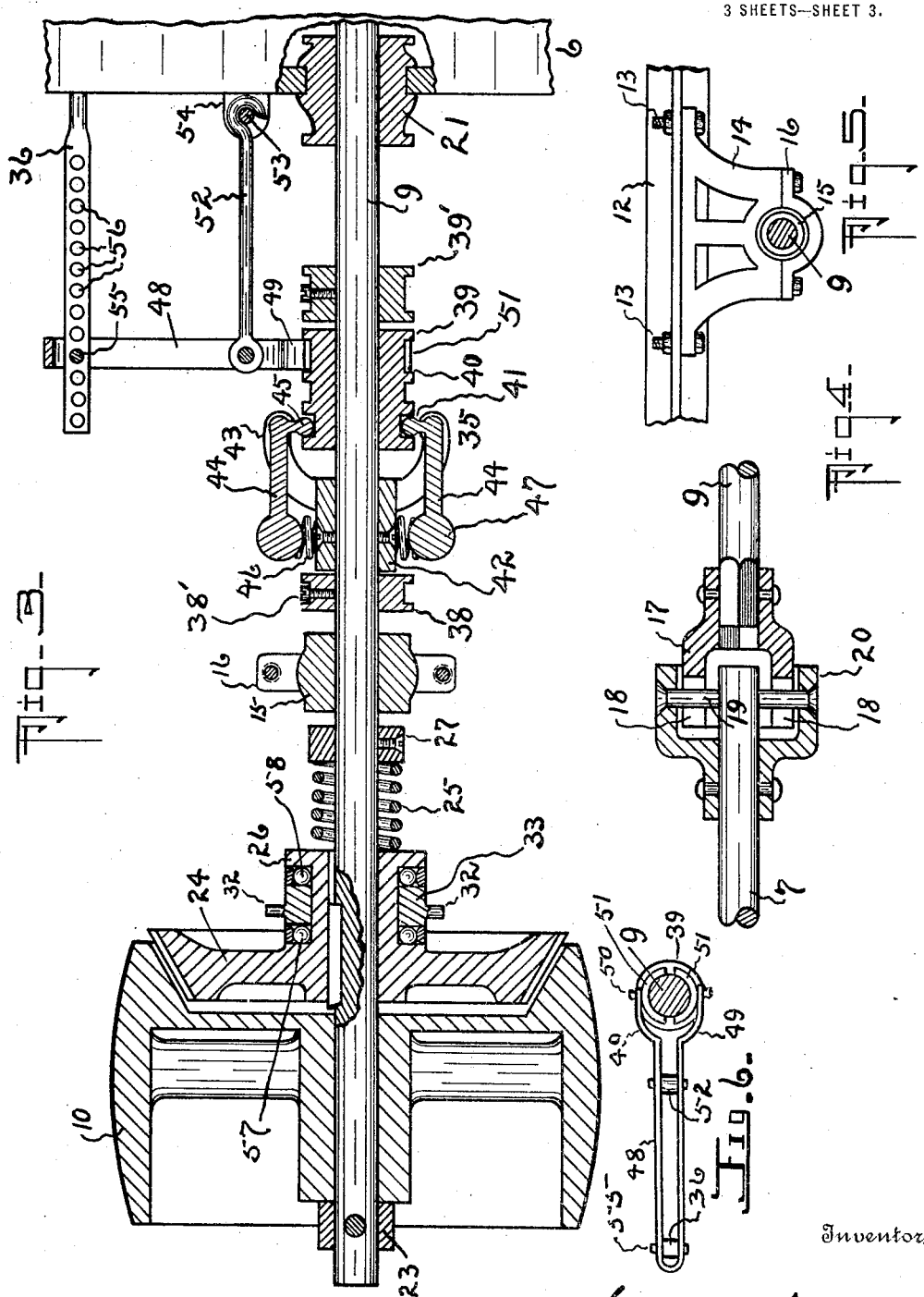

LLOYD C. NEWCOMB AND ELMER E. OTTO, OF OMAHA, NEBRASKA.

POWER-TRANSMISSION ATTACHMENT FOR MOTOR-VEHICLES.

1,235,719. Specification of Letters Patent. Patented Aug. 7, 1917.

Application filed February 16, 1917. Serial No. 149,011.

*To all whom it may concern:*

Be it known that we, LLOYD C. NEWCOMB and ELMER E. OTTO, citizens of the United States, residing at Omaha, in the county of Douglas and State of Nebraska, have invented certain new and useful Improvements in Power-Transmission Attachments for Motor-Vehicles of which the following is a specification.

This invention has for its object, broadly, to provide devices which may be applied to motor vehicles and more particularly to automobiles for utilizing the power of the engine for various purposes. Further and more specific objects of the invention include such a construction that the parts may be economically manufactured, will be durable and convenient in use and may be readily applied to or removed from a vehicle.

With the foregoing objects in view and others to be mentioned hereinafter, the invention presents a novel construction, combination and arrangement of parts as described herein and claimed, and as illustrated in the accompanying drawing, it being understood that the form, size, proportion of parts and minor details of construction may be changed if found to be of advantage, since the scope of the invention is determined by the appended claims.

In the drawing, Figure 1 is a plan view showing the front part of an automobile with the power attachments applied. Fig. 2 is a view of the operative parts in side elevation, the buffer bar and front vehicle axle being in section on line 2—2 of Fig. 1. Fig. 3 is a sectional view on line 3—3 of Fig. 2. Fig. 4 is a detail showing, in longitudinal section, a removable connection for the operating shaft and engine shaft. Fig. 5 is an end view of the hanger, the operating shaft being in transverse section. Fig. 6 is a side view of the governor lever.

The invention is illustrated in connection with an automobile 6, its engine shaft and the carbureter for the engine being respectively indicated at 7 and 8.

In order that the power of the engine may be applied to other uses than for moving the vehicle, and that this power may be under convenient control for operation, we provide certain attachments and mechanism consisting, in part, of a shaft-extension or operating shaft 9 having a band-wheel or pulley 10 mounted on its front end.

A horizontally disposed frame is provided for the support of the shaft 9 and parts mounted thereon, said frame consisting of a pair of substantially parallel bracket arms 11 and a buffer bar 12, the bracket arms being secured, by any suitable means, to the vehicle frame, and projecting forwardly of the engine, and the buffer bar being secured to the front ends of the bracket arms and disposed substantially at right angles thereto.

A hanger is indicated at 14. It is disposed below the horizontal flange of the buffer bar, midway between the bracket arms and is secured thereto by means of suitable keepers 13. Numeral 15 indicates a bushing with which the lower part of the hanger is provided as bearings for the shaft, said bushing being held in operative position by the staple 16.

The rear end of the shaft 9 may be readily connected with the engine shaft for rotation thereby since, as best shown in Fig. 4, it is provided with a sleeve 17 which projects beyond its rear end, said sleeve being provided with a pair of opposed slots 18 adapted to receive the pin 19 of the fan pulley 20 of the engine shaft, and it will be seen that if the shaft 9 is moved forwardly a limited distance, so that the pin 19 will not engage in the slots 18 of said shaft, it will not be actuated by the engine shaft. Numeral 21 indicates a bushing which is mounted upon the automobile frame, said bushing providing bearings for the rear end of shaft 9, lubrication for said bearings being provided by the oil cup 22 shown best in Figs. 1 and 2, and the parts mentioned are so proportioned that, when assembled, the shaft 9 will be maintained in alinement with the engine shaft.

The pulley 10 is preferably mounted as an idler on the shaft 9, an outward end thrust of said pulley being prevented by the collar 23. Mounted on the shaft adjacent to the inner end of the pulley 10 is a clutch 24, the teeth of said clutch normally being engaged by the teeth of the pulley by action of the spring 25, said spring having bearings for one of its ends on the hub 26 of the clutch, the opposite end of the spring bearing upon the collar 27 carried by the shaft.

The clutch is splined on the shaft and is operated manually by means of the hand lever 28 which is fulcrumed between its ends upon the bracket 29, said bracket being mounted upon the buffer bar, the pawl 30 of the lever, under control of the pull rod 31, being depended upon for disengaging the clutch from the pulley 10, the pair of prongs forming the lower part of the lever engaging the pins 32 of the ring 33, said ring having bearings in a suitable groove of the hub 26.

It will be understood that the attachments herein described are useful for the purpose of driving all kinds of ordinary machinery, and they are of particular advantage to farmers or others who, at a limited expense, may use the same in connection with the engine of an automobile as a substitute for a stationary engine, all of the parts being so arranged that they may be conveniently mounted in operative position, and also being adapted to be removed when desired, with the exception of the bracket arms 11 and the buffer bar, which are intended as permanent attachments.

When "cranking the engine," the conventional crank for this purpose is applied to the outer end of the shaft 9 and is operated in the usual manner to cause a free rotatable movement of said shaft for starting the engine, the clutch being first disengaged from the pulley 10 by use of the lever 28, said lever, for this purpose being swung forwardly against the force of the spring, the pawl, as shown in Fig. 2, being disposed with its notch in engagement with the buffer bar for maintaining the clutch in disengaged relation with the pulley.

Means are provided which will operate automatically for controlling the speed of the engine, this being a feature of importance. If the movement of the band or belt 34 is utilized for operating machinery which direct stresses intermittently, such as corn shellers, threshers or wood sawing machines, it is obvious that means for causing uniformity in operation, and preventing "speeding" of the engine, is desirable, and is quite necessary, to prevent injury of the mechanism employed.

A governor 35 is employed for controlling the longitudinal movements of a connecting rod 36 which is attached at its rear end to the feed-control lever 37 of the carbureter 8. Numerals 38 and 39' indicate a pair of collars secured to the shaft 9, and adjacent to the last named collar is a governor sleeve 39 loosely mounted on said shaft, said collar being provided with annular grooves 40 and 41. The governor in the present instance consists of the sleeve 42 non-removably mounted on the shaft and provided with the pairs of opposed, outwardly-projecting supports or brackets 43 to provide a pivotal mounting for the opposed governor arms 44, each having a transverse finger 45 engaging in the groove 41, a spring 46 being employed for connecting the balls 47 of the arms 44.

Numeral 48 indicates a governor lever, this preferably being of loop-form as best shown in Fig. 6 and provided with prongs 49 at its inner ends for a pivotal mounting 50 upon the opposed segment bars 51 which are disposed in the annular groove 40. A link 52 is pivotally mounted at one of its ends upon the lever 48, its opposite end preferably being provided with a hook for a removable mounting upon the pin 53 of a bracket 54, said bracket being mounted stationary with the vehicle frame, and by means of a pin 55 the governor lever may be connected with the connecting rod 36, said pin engaging in one of the apertures 56 of said rod.

By means of the construction, it will be seen that, while using the power of the engine for driving machinery, if undue "speeding of the engine" occurs, the arms 44 of the governor, by centrifugal force, will move outwardly against the force of the spring 46, the outwardly swinging movement of said arms causing the sleeve 39 to slide a limited distance toward the outer end of shaft 9, the connecting rod 36 thereby being moved inwardly, since the member 48 operates as a rock lever on account of its fulcrumed mounting between its ends upon the link 52, and the inward movement of the rod 36 will actuate the lever 37 to at once reduce the fuel supply of the carbureter.

Also, on account of the construction, it is obvious that the supply of gas for the engine will be automatically increased when the speed of the engine is decreased, since the action of the spring 46 at that time causes the balls 47 of arms 44 to move inwardly, which permits a greater quantity of gas to be supplied to the engine. By longitudinally adjusting the mounting of the connecting rod 36, upon the rock lever 48, by use of the pin 55, the normal supply of gas for the engine may be regulated, to correspond with the kind of machinery to be driven by the transmission attachments herein described.

The shaft 9 and parts carried thereby may be readily removed from the buffer bar when it is desired to use the automobile for road work. However, if it is desired to use the automobile while the attachments are carried thereby, the shaft 9 may be moved forwardly a limited distance, so that the engine shaft will be disconnected therefrom, this disconnection occurring, of course after the engine has been "cranked." For the purposes of this operation the collar 38 may be shifted after its set-pin 38'

(Fig. 3.) has been loosened, to permit the disconnection.

Numerals 57 and 58 (Fig. 3.) indicate roller bearings or balls disposed at the ends of the ring 33 for preventing or reducing friction.

Having fully described construction, a further explanation relating to operation is not necessary. What we claim as our invention and desire to secure by Letters Patent is,—

1. In power transmission attachments for a vehicle provided with a carbureter and a revoluble engine shaft, a pair of bracket arms projecting forwardly of the vehicle, a buffer bar disposed transversely of and mounted on said arms, a hanger midway between the bracket arms and mounted on the buffer bar, an operating shaft having bearings in the hanger in alinement with and rotatable by action of the engine shaft, means on the operating shaft and connected with the valve of the carbureter for controlling the degree of rotation of the engine shaft, a pulley adapted to be rotated by actuation of the operating shaft, and a power-transmission member carried by the pulley.

2. In combination with the feed lever of the carbureter and revoluble engine shaft of an automobile, an operating shaft provided with power transmission devices, said operating shaft having journaled bearings at the front of the vehicle in line with and revoluble by the engine shaft, a sleeve movable longitudinally by the revoluble movements of the operating shaft while mounted thereon, a rock lever movable by the sleeve, and a connecting rod movable by the rock lever for controlling the feed lever of said carbureter.

3. In power transmission attachments for a vehicle provided with a carbureter and a revoluble engine shaft, said carbureter having a lever-controlled valve, a pair of substantially parallel bracket arms projecting forwardly of the vehicle, a buffer bar disposed transversely of and mounted on the front ends of said arms, a hanger provided with a bushing, said hanger being mounted upon and projecting below the buffer bar midway between the bracket arms, an operating shaft, a sleeve on the operating shaft, said operating shaft having bearings in the bushing of the hanger in line with and rotatable by the engine shaft, a governor actuated by the rotation of the operating shaft for moving the sleeve, devices connected with the sleeve and valve-lever of the carbureter for controlling the degree of rotation of the engine shaft, a pulley on the operating shaft, a clutch for locking the pulley on the operating shaft, and a power-transmission member carried by the pulley.

4. In power transmission attachments for a vehicle having a rotatable engine shaft and a carbureter having an actuating lever for controlling the degree of said rotation, a supporting frame including horizontal bracket arms connected with and projecting forwardly of the vehicle and a buffer bar carried thereby, a hanger below the supporting frame and provided with a bushing, an operating shaft provided with a sleeve and journaled in the bushing substantially in line with and rotatable by action of said engine shaft, a governor on the operating shaft for moving the sleeve longitudinally by the rotatable movements of the operating shaft, a rock lever movable by the sleeve, a connecting rod disposed transversely of and mounted on the rock lever for controlling the actuating lever of the carbureter, and means for adjusting the mounting of the rock lever longitudinally of the connecting rod.

5. In combination with the fuel feed-lever of the carbureter and revoluble engine shaft of an automobile, an operating shaft provided with power-transmission devices including an idler pulley, said operating shaft having journaled bearings at the front of the vehicle and adapted to be removably connected with the engine shaft to be revolved thereby, a sleeve on the operating shaft, said sleeve being movable longitudinally by the revoluble movements of said operating shaft, a rock lever movable by the sleeve, a connecting rod movable by the rock lever for controlling the fuel feed-lever of said carbureter, and a clutch arranged for connecting the pulley in locked relation with the operating shaft.

6. In combination with the fuel feed-lever of the carbureter and revoluble engine shaft of an automobile, a pull-and-push rod connected with said fuel-feed lever, an operating shaft in bearings and provided with a sleeve, means for maintaining the operating shaft in alinement with the engine shaft at the front of the engine, means for removably connecting the operating shaft with the engine shaft to provide for the rotation of said operating shaft, a band-wheel mounted as an idler on the operating shaft, a clutch splined on the shaft, resilient means for causing normal engagement of the clutch with the band wheel, a hand lever for disengaging the clutch from the band wheel, a governor upon and arranged for actuation by the rotatable movements of the operating shaft for moving the sleeve, and mechanism connected with and adapted to communicate a movement to the pull-and-push rod from said sleeve for controlling the rotatable movements of said engine shaft.

7. In combination with the fuel feed-lever of the carbureter and revoluble engine shaft of an automobile, an operating shaft in bearings disposed at the front of the vehicle in line with and rotatable by the engine shaft, a pulley on the operating shaft, a sleeve adapted to be moved by the rotatable movement of the operating shaft, a rock lever movable by the sleeve, a connecting rod pivotally mounted on the rock lever for moving the fuel feed-lever to control the rotation of the engine shaft, and means for adjusting the pivotal mounting of the connecting rod and rock lever.

8. In combination with the fuel feed-lever of the carbureter and revoluble engine shaft of an automobile, a pair of substantially parallel bracket arms projecting forwardly of and secured to the automobile, a buffer bar disposed transversely of and secured to the front ends of said arms, a hanger secured to the buffer bar and having a bushing disposed in horizontal alinement with the engine shaft, an operating shaft having bearings in the bushing of the hanger and adapted to be connected with the engine shaft to be rotated thereby, means arranged to be moved on the operating shaft by the rotatable movement of said operating shaft for moving the fuel feed-lever of the carbureter to control the degree of rotation of the engine shaft, a pulley loosely mounted on the operating shaft, and a clutch for locking the pulley with said operating shaft.

9. In power transmission attachments for a vehicle provided with a carbureter, a revoluble engine shaft and a bushing disposed at the front and in line with the engine shaft, said cylinder being provided with a fuel feed-lever, a pair of bracket arms projecting forwardly of the vehicle, a buffer bar disposed transversely of and mounted on said arms, a hanger provided with a bushing, said hanger being disposed midway between the bracket arms and mounted on the buffer bar with its bushing in line with the engine shaft, an operating shaft having bearings in the bushing of the hanger and bushing of the vehicle and being rotatable by action of the engine shaft, means on the operating shaft and connected with the fuel feed-lever of the carbureter for controlling the degree of rotation of the engine shaft, a pulley disposed forwardly of the hanger and mounted as an idler on the operating shaft for supporting a power-transmission member, a clutch splined on the operating shaft, resilient means to cause normal engagement of the clutch with the pulley, and a manually operative member for disengaging the clutch from said pulley.

In testimony whereof, we have affixed our signatures in presence of two witnesses.

LLOYD C. NEWCOMB.
ELMER E. OTTO.

Witnesses:
HIRAM A. STURGES,
ARTHUR H. STURGES.

Copies of this patent may be obtained for five cents each, by addressing the "Commissioner of Patents, Washington, D. C."